United States Patent [19]
McMahon

[11] 3,870,776
[45] Mar. 11, 1975

[54] METHOD FOR MAKING CERAMIC-METAL STRUCTURES

[75] Inventor: John F. McMahon, Barrington, R.I.

[73] Assignee: Metalized Ceramics Corporation, Providence, R.I.

[22] Filed: Jan. 2, 1973

[21] Appl. No.: 320,621

[52] U.S. Cl............... 264/61, 264/316, 264/317, 264/DIG. 36
[51] Int. Cl................. C04b 35/64, C04b 37/02
[58] Field of Search ........ 264/60, 61, DIG. 36, 316, 264/317

[56] References Cited
UNITED STATES PATENTS

| | | | |
|---|---|---|---|
| 3,247,573 | 4/1966 | Noack | 264/61 X |
| 3,322,871 | 5/1967 | Noack et al. | 264/61 X |
| 3,324,014 | 6/1967 | Modjeska | 264/61 X |
| 3,695,960 | 11/1972 | Richter | 264/63 X |
| 3,706,582 | 12/1972 | Meyer | 264/61 X |
| 3,798,762 | 3/1974 | Harris | 264/61 X |

OTHER PUBLICATIONS

"Dictionary of Ceramics," by A. E. Dodd, Philosophical Library Inc., N.Y. 1964 pp. 106, 107

Primary Examiner—Robert F. White
Assistant Examiner—Thomas P. Pavelko
Attorney, Agent, or Firm—Kenway & Jenney

[57] ABSTRACT

A method for manufacturing metalized ceramic packages, bases and components. A moving belt of plastic film serves as a foundation upon which desired metal patterns and green ceramic patterns can be silk-screened, cast or sprayed in sequence. A secondary ceramic layer, usually thicker, may be applied to serve ultimately as a base layer by casting, doctor blading or other suitable method. After drying, the composite metal and green ceramic structure may be machined, punched or otherwise formed either before or after the plastic film is stripped away. The green ceramic may then be fired in a kiln in a so-called co-firing process to bond the metal to the ceramic as it becomes vitrified.

4 Claims, 7 Drawing Figures

PATENTED MAR 11 1975             3,870,776

METHOD FOR MAKING CERAMIC-METAL STRUCTURES

BACKGROUND OF THE INVENTION

Ceramic packages and bases have been fabricated in a number of ways. Early work generally involved the application of a metal paste to a previously fired ceramic body after which a further firing took place in an attempt to bond the metal to the ceramic. The results were frequently unsatisfactory in that a poor bond often was had, the surface finish of the metal was not always smooth enough for further processing involving hermetic seals, adaptability of the process to multilayer designs was lacking and desired conductor pattern geometry could not be achieved.

Another process which has come to be used very widely in the manufacture of ceramic-metal structures is that known as "metalizing in the green." Various patents and publications describe such a process and suitable materials for use in the process; for example, U.S. Pat. Nos. 2,582,903 and 3,074,143 among many others. Briefly, as the patents disclose, the method involves the mixing of bulk alumina with resins, plasticizers and solvents to form a homogeneous suspension which may be cast to form a layer of ceramic material from which the volatiles may be driven off to leave the layer in a strong, flexible condition in which it can be punched, machined or otherwise formed into any desired shape. Either before or after the forming operations, metal may be silk-screened or sprayed upon the ceramic in desired patterns. Generally, the metallic patterns serve as leads or circuit elements over which additional dielectric material may be screened. Depending upon the type of package or component being made single layers or sandwiches of ceramic material and metal may be assembled and co-fired to bond the metal to the ceramic and to vitrify the ceramic.

SUMMARY OF THE INVENTION

It is with a modification of the last-mentioned method that the present invention is basically concerned. Rather than following the prior art of casting first a ceramic layer upon which metals and dielectric materials are screened, a moving plastic transport belt is used as a foundation upon which metallic patterns may be screened, sprayed or cast. Following the application of metal, dielectrics or ceramic material may be similarly applied over the metallic patterns. If desired, further ceramic or metallic layers or patterns may be applied in the same manner. Then, a heavier ceramic layer ultimately to serve as a base layer may be applied over the patterns, the entire combination may be dried and such forming operations as are required may then be performed. The carrier film may be stripped away leaving the composite of metallic and ceramic patterns upon the ceramic and the composite may then be fired. Alternatively, the plastic film may be left in place to be burned off during the subsequent firing. In still another alternative process a permanent continuous belt may be employed as the carrier. Such a belt is coated with plastic of the same characteristics as the film and is separated from the ceramic-metal structure after the drying step. The permanent belt is then cleaned and re-coated for further use.

Preferred forms and steps of the invention are illustrated in the drawing appended hereto in which.

DESCRIPTION OF PREFERRED EMBODIMENT

Figure 1:
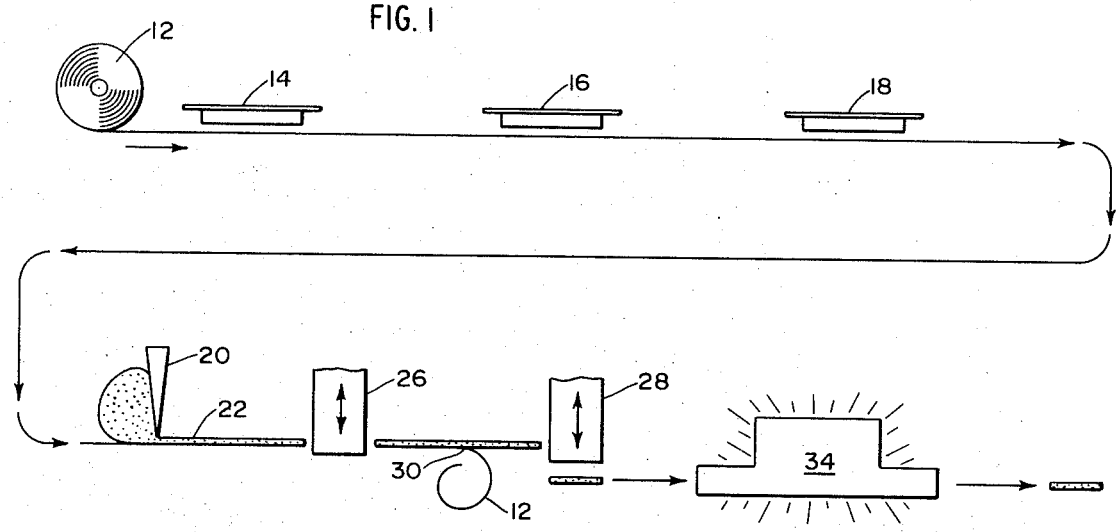
FIG. 1 is a schematic flow chart of a series of steps involved in the practice of the present invention.

FIG. 1 illustrates in simplified form the apparatus and process presently preferred for practicing the invention. Obviously, the arrangements would be different in the alternative processes and apparatus outlined above.

At the left of FIG. 1 there may be seen a roll or spool of transport film 12. Any one of several materials such as MYLAR of TEFLON is suitable, but a clear transparent KODACEL film two thousandths of an inch thick has been successfully employed. The spool of material 12 is preferably mounted for rotation about a suitable axis and means indicated by the arrows is provided to withdraw the film 12 in a straight line along a flat supporting surface such as a table.

In the first processing position to the right of the roll of material a so-called "thick film" silk-screen 14 is utilized to deposit metallic paste conductor patterns of predetermined shape upon the film 12. The metallic paste patterns are then dried and a second thick-film silk-screen 16 may be used to deposit ceramic paste material in any desired pattern as determined by the silk-screen. The ceramic paste material is also dried and a third silk-screen 18 may be utilized for a further metal paste deposit if that is required in the final structure to be produced. The third deposit is also dried. It should be noted that each of the thick-film silk-screening steps follows well-known practices in the art where the metal used is generally a paste or semi-fluid slurry of powdered tungsten, molybdenum or manganese or combinations of such metals suspended in a volatile vehicle. The ceramic or dielectric material is generally made up of bulk alumina, resin, plasticizers and solvents as previously described with reference to the prior art, but the organic materials are in higher proportions in order to form a semi-fluid paste suitable for silk-screening. Suitable viscosities for the silk-screened metals or ceramics are of the order of 150,000 cps. The drying steps, in each case, may be simple air-drying or the transport film and the deposits may be passed under a bank of heating lamps or subjected to forced-air drying.

After the screening processes are finished, the transport film passes under a doctor blade 20 which is set at a height above the transport film to permit a layer of ceramic material 22 of controlled thickness to be formed over the screened materials. In this instance, the ceramic material is also preferably bulk alumina of the order of 94 percent, again mixed with suitable binders, plasticizers and solvents but at a viscosity about the same as that disclosed in the patents cited above. As in well-known in the art, this material when dried, as is the case after it passes beyond the doctor blade 20, has a semi-flexible leather-like consistency and it may be machined, punched, cut or otherwise formed and shaped as is indicated by the forming tool 26 and the punch 28.

Removal of the plastic transport film is indicated at the point 30 although, in some instances, it may be preferable to let the plastic film remain in place. Then, in a kiln 34, the entire composite assembly may be fired and the film, if left in place, will be burned away as the co-firing of ceramic and metal takes place, vitrifying the ceramic and bonding the metal to that ceramic at the same time.

Figure 2:
FIG. 2 is a sectional view of the plastic transport film used as the disposable carrier.

FIG. 2 is simply a sectional view of the basic transport film as it is drawn from the reel preparatory to receiving the various deposits.

Figure 3:
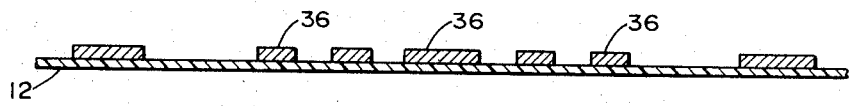
FIG. 3 is a fragmentary sectional view of an early step in the process illustrating the screening or spraying of metal patterns upon the base transport film.

FIG. 3 indicates in section the transport film 12 after the first screening and drying of a metal pattern has taken place. Metal islands 36 as well as metal islands 40 of various dimensions which may be interconnected, as desired, are built up upon the plastic transport film. It is also feasible to apply the metal to the transport film by spraying rather than by silk-screening.

Figure 4:
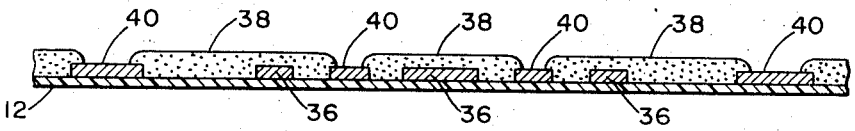
FIG. 4 is a fragmentary sectional view of a second step wherein ceramic materials are screened over the metallic patterns.
Figure 5:
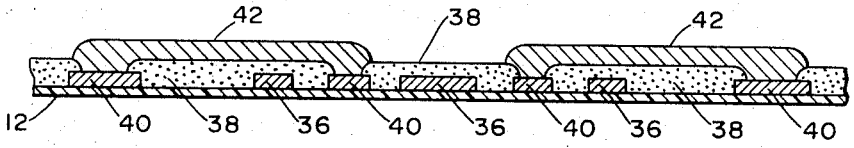
FIG. 5 is a similar view of a further screening step wherein metallic bridge members are screened over the ceramic.

FIG. 4 illustrates the appearance of the assembly after a pattern of ceramic material has been silk-screened and dried upon and about the metal pattern. In this instance, it will be seen that some of the metal members are buried by the ceramic material as at 38 while others are left exposed as at 40. In FIG. 5, additional metal patterns 42 are silk-screened or sprayed in place, dried and used to bridge the ceramic and interconnect portions of the metal pattern as illustrated.

Figure 6:
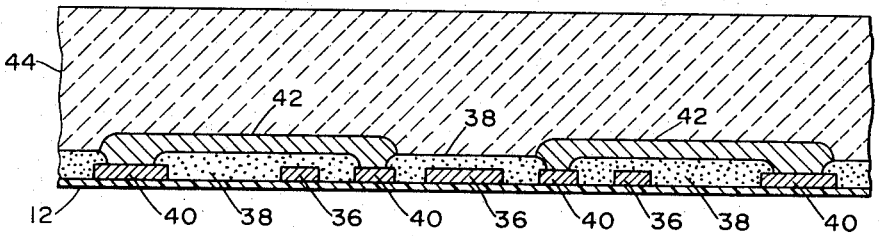
FIG. 6 is a similar view wherein the casting of a ceramic body over the previously screened materials is illustrated.

In FIG. 6, a relatively heavy layer or body of ceramic 44 corresponding to the layer 22 of FIG. 1 is shown as cast upon the previously deposited patterns. This layer is, as shown, thicker and of higher viscosity than that used in silk-screening. It is, as noted above, of the same general constituents and characteristics as the material used in the prior art as the transport base itself.

Figure 7:
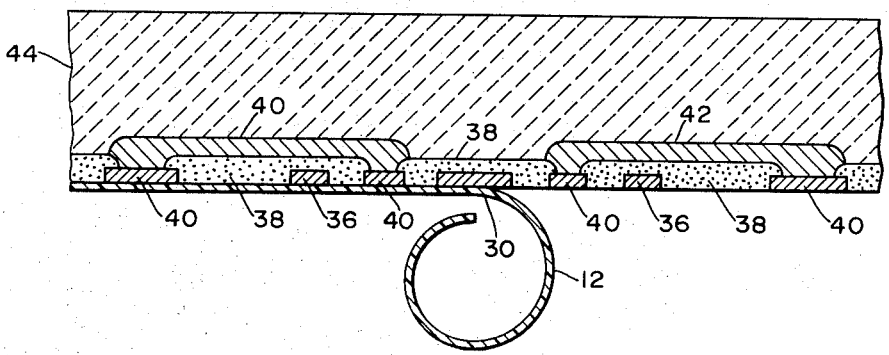
FIG. 7 is a similar view showing the removal of the transport film.

FIG. 7 illustrates the stripping away of the plastic transport film 12, which may be done manually or by simple mechanical means after the composite ceramic-metal deposited structure is dried. Alternatively, as noted above the film may be left in place to be simply burned away when the composite structure is fired at temperatures of 1,600°C or higher in the kiln 34.

The use of the transport film alone or as a coating on a belt makes it possible to greatly reduce the cost of production of various metalized ceramic components because the advantages of automatic and continuous production may be realized. Also, as in the case of the metallic members 42, the metal is totally embedded within the ceramic and is therefore mechanically enclosed as well as being chemically combined with the ceramic.

The use of the transport film also permits forced drying of the metallic and ceramic patterns which are silk-screened upon the transport film, such a process not being practical in the prior art where the ceramic tape itself is used as the transport because the drying action would cause the tape to become too dry for necessary subsequent handling. Also, the process of the present invention offers the opportunity for continuous inspection and if reworking becomes necessary, it may be done before the casting of the expensive heavier ceramic layer 44 upon the deposited patterns. Other advantages also accrue to the user of the process of the present invention in the form of less contamination and less possible damage to metal surfaces as well as the avoidance of subsequent faults in hermetic seals.

What is claimed is:

1. In the manufacture of composite structures for use as multi-layered components of a hermetic package from dielectric ceramic such as those composed mainly of alumina mixed with plasticizers, binders and solvents for said plasticizers and from a paste of powdered metal selected from the group composed of tungsten, molybdenum, manganese or mixtures thereof, the method which comprises the steps of depositing said paste upon a transport film to form a thin predetermined metallic pattern thereon, drying said metallic pattern, applying a thick body of said ceramic over said metallic pattern and upon said transport film, drying said ceramic body to form a green composite structure, and firing said green composite structure at a temperature higher than approximately 1,600°C to vitrify said ceramic and bond said metal hermetically to said ceramic, said transport film being burned away during said firing to leave a continuous planar surface suitable for hermetic sealing thereto of a further layer.

2. In the manufacture of composite structures for use as multi-layered components of a hermetic package from dielectric ceramic such as those composed mainly of alumina mixed with plasticizers, binders and solvents for said plasticizers and from a paste of powdered metal selected from the group composed of tungsten, molybdenum, manganese or mixtures thereof, the method which comprises the steps of depositing said paste upon a transport film to form a thin predetermined metallic pattern thereon, drying said metallic pattern, applying a thick body of said ceramic over said metallic pattern and upon said transport film, drying said ceramic body to form a green composite structure, stripping away said transport film, and firing said green composite structure at a temperature higher than approximately 1,600°C to vitrify said ceramic and bond said metal hermetically to said ceramic, the removal of said transport film leaving a continuous planar surface suitable for hermetic sealing thereto of a further layer.

3. In the manufacture of composite structures for use as multi-layered components of a hermetic package from dielectric ceramic such as those composed mainly of alumina mixed with plasticizers, binders and solvents for said plasticizers and from a paste of powdered metal selected from the group composed of tungsten, molybdenum, manganese or mixtures thereof, the method which comprises the steps of depositing said paste upon a transport film to form a thin predetermined metallic pattern thereon, drying said metallic pattern applying a relatively thin layer of said ceramic upon said predetermined metallic pattern and upon said transport film in a predetermined ceramic pattern leaving portions of said predetermined metallic pattern exposed, drying said predetermined ceramic pattern, depositing a second quantity of said paste upon said predetermined ceramic pattern and upon said exposed portions of said predetermined metallic pattern to form metallic interconnections between said exposed portions, drying said metallic interconnections, applying a relatively thick ceramic body over said predetermined ceramic pattern and said interconnections, drying said ceramic body to form a green composite structure, firing said green composite structure at temperatures higher than approximately 1,600°C to vitrify said ceramic and bond said metal hermetically to said ceramic, said transport film being burned off during said firing to leave a continuous planar surface suitable for hermetic sealing thereto of a further layer.

4. In the manufacture of composite structures for use as multi-layered components of a hermetic package from dielectric ceramic such as those composed mainly of alumina mixed with plasticizers, binders and solvents for said plasticizers and form a paste of powdered metal selected from the group composed of tungsten, molybdenum, manganese or mixtures thereof, the method which comprises the steps of depositing said paste upon a transport film to form a thin predetermined metallic pattern thereon, drying said metallic pattern, applying a relatively thin layer of said ceramic upon said predetermined metallic pattern and upon said transport film in a predetermined ceramic pattern leaving portions of said predetermined metallic pattern exposed, drying said predetermined ceramic pattern, depositing a second quantity of said paste upon said predetermined ceramic pattern and upon said exposed portions of said predetermined metallic pattern to form metallic interconnections between said exposed portions, drying said metallic interconnections, applying a relatively thick ceramic body over said predetermined ceramic pattern and said interconnections, drying said ceramic body to form a green composite structure, stripping away said transport film, and firing said green composite structure at temperatures higher than approximately 1,600°C to vitrify said ceramic and bond said metal hermetically to said ceramic, the removal of said transport film leaving a continuous planar surface suitable for hermetic sealing thereto of a further layer.

* * * * *